United States Patent [19]

Dalbo et al.

[11] Patent Number: 5,251,943
[45] Date of Patent: Oct. 12, 1993

[54] PICK-UP FOR HANDICRAFT ITEMS

[75] Inventors: Emil J. Dalbo; Lorraine E. Dalbo, both of Atlanta, Ga.

[73] Assignee: Dal-Craft, Inc., Tucker, Ga.

[21] Appl. No.: 951,175

[22] Filed: Sep. 24, 1992

[51] Int. Cl.$^5$ .............................................. B25J 15/00
[52] U.S. Cl. .................................. 294/1.1; 294/19.1; 294/25
[58] Field of Search ......................... 294/1.1, 19.1, 25; 24/306, 442, 451, DIG. 11; 81/487

[56] References Cited

U.S. PATENT DOCUMENTS

| 888,976 | 5/1908 | Duperrault | 294/25 |
| 1,285,473 | 11/1918 | Tripp | 294/25 |
| 4,073,530 | 2/1978 | Seidler | 294/1.1 X |
| 4,174,620 | 11/1979 | Russell | 294/25 X |
| 4,653,789 | 3/1987 | McWilliams et al. | 294/1.1 |
| 4,957,217 | 9/1990 | Ritson | 294/1.1 X |
| 5,011,150 | 4/1991 | Averill | 294/19.1 X |
| 5,056,786 | 10/1991 | Bellettini et al. | 294/19.1 X |

FOREIGN PATENT DOCUMENTS

| 656118 | 4/1929 | France | 294/25 |
| 996865 | 12/1951 | France | 294/25 |
| 116834 | 9/1926 | Switzerland | 294/25 |

Primary Examiner—Johnny D. Cherry
Attorney, Agent, or Firm—James B. Middleton

[57] ABSTRACT

A pick-up for handicraft items and accessories consists of a stick having an adhering member on one end of the stick. The adhering member may be hook material of hook and loop fasteners, or it may be adhesive of the type that remains tacky. The stick may have a ring to be supported by a person's finger, or may be long enough to be grasped by the hand. A kit for the pick-ups includes a bottle of the adhesive and several sticks. The package for the kit has a cradle to hold a stick when not in use, and provides a base for the bottle of adhesive.

7 Claims, 1 Drawing Sheet

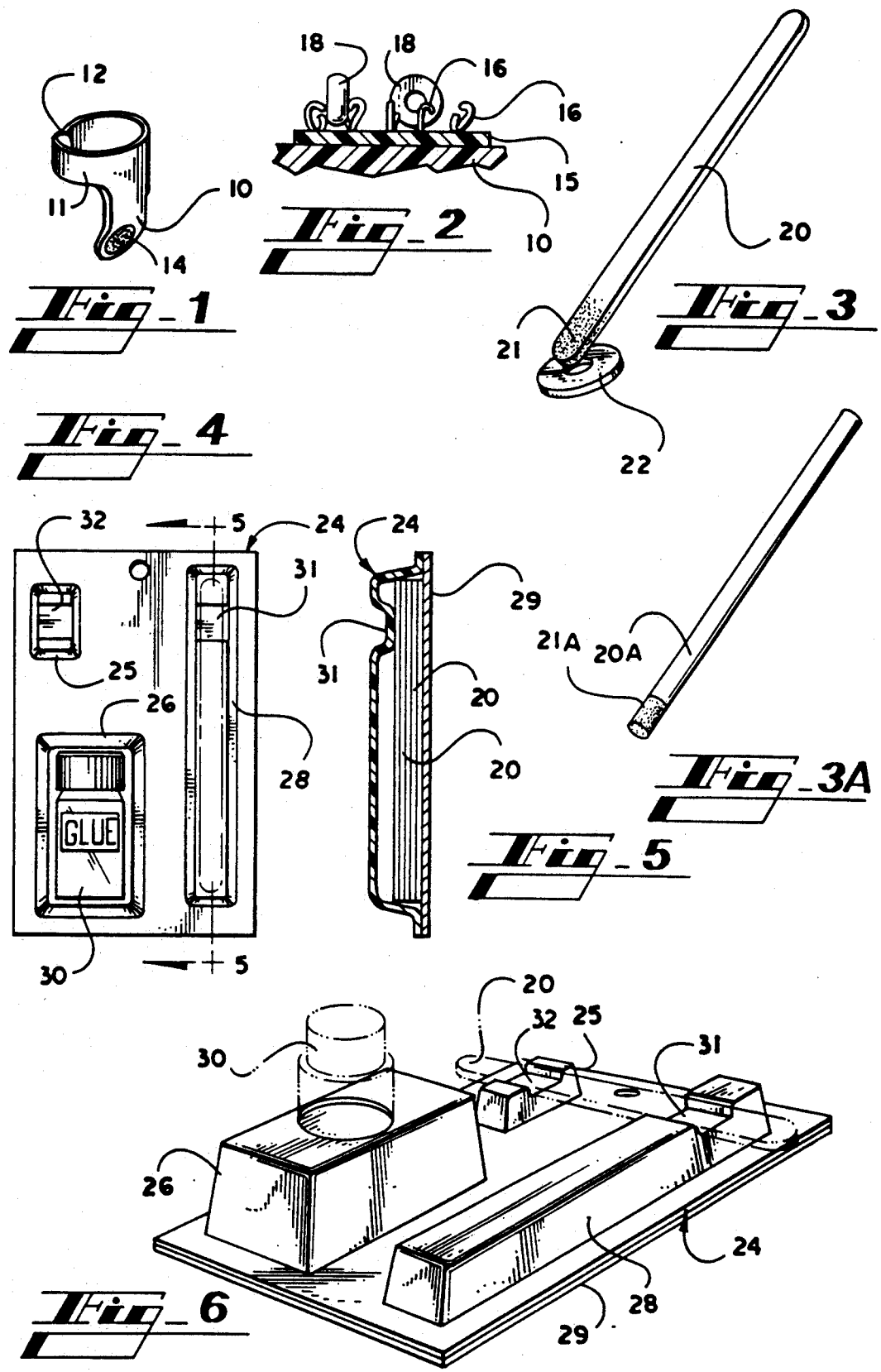

PICK-UP FOR HANDICRAFT ITEMS

BACKGROUND OF THE INVENTION

1. Field of the Invention

This invention relates generally to handicrafts and the like, and is more particularly concerned with a pick-up for beads, and similar small items used in needlework and other craft and hobby projects.

2. Description of the Prior Art

For many years, various accessories have been used to decorate needlework projects. By way of example, sequins, rhinestones and beads have been sewn into needlework projects, and have been used to decorate clothing. The usual technique for handling the accessories has been to place the accessories into a container or on a surface, and simply pick up one of the accessories by passing the sewing needle through the center hole of the accessory. For accessories or parts used in other handicraft projects, the parts may be placed on a surface and retrieved as needed with tweezers or other tool.

Recently, small beads have become very popular for decorating needlework projects, largely for cross-stitch. In spite of the popularity of the beads, there is no improved system for picking up the individual beads as needed. Still, the usual technique is to store the beads in a container, and to pick up individual beads by passing a needle through the center hole in the bead. It is known to place tape on a person's finger, and to dip the finger into a container of beads, but one is likely to stick the needle into one's finger when trying to retrieve a bead from the tape. Other efforts at improving the system have been directed to an improved container for the beads rather than an improved system for picking up the beads.

SUMMARY OF THE INVENTION

The present invention provides a pick-up for beads and other items, the pick-up including an elongated member for engagement with a quantity of beads, and adhering means on an end of the elongated member for causing beads or the like to adhere to said elongated member.

The elongated member may take the form of a relatively short member carried by a finger mounting means, or a relatively long member to be gripped in the hand. The adhering means may take many forms, and may vary somewhat depending on the particular item to be picked up.

One embodiment of the present invention includes an elongated member having an area of the hook member from hook and loop fasteners fixed thereto. The hook members may or may not be coated with an adhesive. Another embodiment of the invention utilizes adhesive alone as the adhering means.

The present invention further provides a kit including a quantity of adhesive, a plurality of elongate members, and packaging means that may be used as storage means for the materials and as holding means during use.

BRIEF DESCRIPTION OF THE DRAWINGS

These and other features and advantages of the present invention will become apparent from consideration of the following specification when taken in conjunction with the accompanying drawings in which:

FIG. 1 is a perspective view showing one form of pick-up made in accordance with the present invention;

FIG. 2 is an enlarged, fragmentary cross-sectional view showing the adhering means on the device of FIG. 1;

FIGS. 3 and 3A are perspective views showing modified forms of pick-up made in accordance with the present invention;

FIG. 4 is a top plan view showing a kit made in accordance with the present invention;

FIG. 5 is a cross-sectional view taken along the line 5—5 in FIG. 4; and,

FIG. 6 is a perspective view showing the kit of FIG. 5 as set for use.

DETAILED DESCRIPTION OF THE EMBODIMENTS

Referring now more particularly to the drawings, and to those embodiments of the invention here presented by way of illustration, FIG. 1 shows an elongated member 10 carried by a ring 11 to be received on a person's finger. The ring 11 is split as at 12, and it is contemplated that the device will be made of a plastic material having enough elasticity to fit virtually any finger.

Carried on the lower end of the elongated member 10 is the adhering means 14. As a result, a person can place the ring 11 on a finger, and dip the member 10 into a container of small beads, or urge the adhering means 14 against a quantity of beads on a surface. One or more of the beads or other accessories will adhere to the adhering means, and a needle can be passed through the center hole of the accessory for use in the needlework project without danger of sticking one's finger with the needle.

The beads that are currently popular measure around 2 mm in diameter, and about 1 mm in thickness, so the beads are generally toroidal. It has been found that these beads are sized to be received between the individual hook members of the hook material for hook and loop fasteners. Thus, as shown in FIG. 2, the adhering means 14 may include a piece of the hook material which comprises a backing 15 having a plurality of hooks 16 extending therefrom.

Those skilled in the art will realize that the hooks 16 on the backing 15 are arranged in rows and columns, and the spacing between rows and columns is substantially equal. As a result, beads, such as the beads 18, may be held between adjacent hooks 16. It will of course also be recognized that, while the hook material is readily available, a special adhering means may be provided. One must provide only a backing material, and projections extending from the backing material for holding the beads. Any such material is contemplated by the present invention.

Though the hooks or other projections 16 alone will frequently be sufficient to pick up, and to retain, beads, it may be desirable to add an adhesive for easier pick up and better retention. If adhesive is to be added, the adhering means 14 may be coated with adhesive, or the entire end of the member 10 may be dipped into adhesive.

If an adhesive is to be used on the pick-up device shown in FIGS. 1 and 2, the adhesive should be the type that does not fully cure, so the adhesive remains tacky. Such an adhesive is pressure sensitive, and allows the easy removal of things stuck to the adhesive. This adhesive is well known in the art, and no further description is thought to be necessary. The term "pressure sensitive" is intended with its ordinary meaning that material will bond to the adhesive with only light pressure.

Looking at FIG. 3 of the drawings, it will be noted that the elongated member 20 is long enough to be gripped by the hand in normal fashion. The lower end of the member 20 has an adhering means 21. Those skilled in the art will understand that both ends may include adhering means if desired; further, the two ends may have slightly different adherence characteristics. As shown in FIG. 3, the adhering means 21 consists of only an adhesive which can pick up parts 22 of virtually any type. FIG. 3A is similar to FIG. 3, but the stick is round instead of flat. Parts carry the same numerals as in FIG. 3, but with an A suffix.

It will be realized that, if the pick-up devices as shown in FIGS. 3 or 3A were packaged, the adhering means 21 would adhere to package material. To prevent such adherence, release paper or the like would be required, thereby increasing the cost of packaging. Rather than package in this manner, it is contemplated that the pick-up devices will be packaged in the kit shown in FIGS. 4-6.

FIG. 4 shows a pick-up kit as it may be sold, the kit being in the form of the well-known blister pack. Those skilled in the art will understand that the conventional blister pack consists of a vacuum formed plastic front piece 24, the front piece 24 including at least one "blister", or container, such as the blisters 25, 26 and 28. The front piece is fixed to a cardboard backing 29 which closes the blisters.

Considering the kit of FIG. 4 in more detail, the blister 26 is sized to receive a bottle of glue indicated at 30. The elongated blister 28 is shaped to receive a plurality of elongated members such as the member 20. It will be understood, however, that the members 20 in FIG. 4 do not include adhering means thereon. As a result, one member 20 can easily be removed from the blister 28.

As shown in FIG. 4, the blister 25 is empty, and is not used at the time the kit is sold. However, the use of the blister 25 is illustrated in FIG. 6 which shows the kit arranged for use. First, it will be understood that the backing 29 can be cut, or otherwise opened, to allow removal of the glue 30, and one or more of the elongated members 20. Next, the surface of the blister 26 can be provided with an opening of a size to receive the bottle 30. The blister 25 therefore acts as a base, or means to prevent accidental tipping of the bottle 30.

The kit shown in FIGS. 4-6 includes a cradle to receive one of the pick-up devices as illustrated in FIG. 3. It will be understood that the cradle may be used during the initial coating of the member 30 with adhesive, and/or may be used as a support between uses while a person is working on a handicraft project.

Many arrangements are possible to provide a cradle for the elongated member 20, but as here shown there is a first indentation 31 in the blister 28, and a second indentation 32 in the blister 25, the indentations 31 and 32 being aligned to receive an elongated member 20.

With the above description in mind, it will be understood that the kit as shown in FIGS. 4 and 5 will include a quantity of adhesive 30, and a plurality of elongated members 20 or 20A. If desired, the elongated members 20 may be of various widths, which may be convenient for picking up various sizes of parts or accessories. Also, the characteristics of the adhesive may vary, in that one may dip a member 20 one time in the adhesive 30, or one may dip successive times, allowing partial curing between dips. With the latter technique, the adhesive will be thicker and will readily pick up anything that touches the adhering means so formed.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit of scope of the invention as outlined in the appended claims.

We claim:

1. A pick-up for retrieving at least one piece from a plurality of pieces consisting of a group of handicraft parts and accessories, said pick-up comprising a generally rigid elongated member having a first end adapted to be urged against said plurality of pieces, adhering means fixed to said first end of said elongated member for adhering to at least one piece of said plurality of pieces when said elongated member is urged against said plurality of pieces, said elongated member being receivable by a person's hand for retrieving said pieces, said adhering means comprising a base member carried by said first end of said elongated member, and a plurality of projections extending from said base member, said projections being so spaced that each piece of said plurality of pieces is receivable between adjacent projections of said plurality of projections.

2. A pick-up as claimed in claim 1, said elongated member further including a ring receivable on a person's finger, said ring being fixed to one end of said elongated member so that said elongated member extends beyond said person's finger to be easily urged against said group.

3. A pick-up as claimed in claim 1, and further including a pressure sensitive adhesive generally covering said adhering means.

4. A pick-up as claimed in claim 3, said pressure sensitive adhesive consisting of an adhesive that remains tacky.

5. A pick-up for retrieving at least one piece from a plurality of pieces consisting of a group of handicraft parts and accessories, said pick-up comprising a generally rigid elongated member having a first end adapted to be urged against said plurality of pieces, adhering means fixed to said first end of said elongated member for adhering to at least one piece of said plurality of pieces when said elongated member is urged against said plurality of pieces, said adhering means comprising a base member carried by said first end of said elongated member, a plurality of projections extending from said base member, and a pressure sensitive adhesive generally covering said plurality of projections.

6. A pick-up as claimed in claim 5, wherein said projections are so spaced that each piece of said plurality of pieces is receivable between adjacent projections of said plurality of projections.

7. A pick-up as claimed in claim 6, wherein said base member and said projections comprise hook material of hook and loop fastener.

* * * * *